United States Patent Office 3,542,806
Patented Nov. 24, 1970

---

3,542,806
**2-(1-SUBSTITUTED-3-PYRROLIDINYL)-
ISOINDOLINES**
Grover Cleveland Helsley, Richmond, Va., assignor to A. H. Robins Company, Incorporated, Richmond, Va., a corporation of Virginia
No Drawing. Filed Mar. 29, 1968, Ser. No. 717,451
Int. Cl. C07d 27/48
U.S. Cl. 260—326.1                                  17 Claims

ABSTRACT OF THE DISCLOSURE 2-(1-substituted-3 - pyrrolidinyl) - isoindolines having antidepressant activity are disclosed. The compounds are prepared by metal hydride reduction of N-(1-substituted-3 - pyrrolidinyl) - phthalimides. Additional compounds within the scope of the invention are prepared from 2-(3-pyrrolidinyl)-isoindoline.

---

This invention relates to novel 2-substituted isoindoline compounds, particularly 2-(1-substituted-3-pyrrolidinyl)-isoindolines, therapeutic compositions containing the same as active ingredients and to methods for making and using them.

The novel chemical compounds of this invention are represented by the following formula:

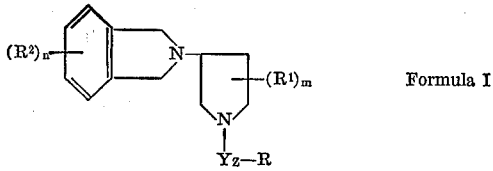

Formula I wherein:

R is a member selected from the group consisting of hydrogen, lower alkyl, phenyllower alkyl, phenyl, lower cycloalkyl, N-lower alkyl carbamoyl, N-phenyl carbamoyl, N-substituted phenyl carbamoyl, halophenoxyacyl, N,N-diphenyl carbamoyl, carbamoyl and amidino;

$R^1$ is a member selected from the group consisting of hydrogen and lower alkyl;

$R^2$ is a member selected from the group consisting of hydrogen, halogen having an atomic weight less than 80, trifluoromethyl, lower alkyl and lower alkoxy;

Y is lower alkyleneoxy,

Z is a positive integer from 0–1 inclusive, m is a positive integer from 0–2 inclusive, and n is a positive integer from 0–4 inclusive The novel compounds described hereinafter have utility as physiologically active agents and particularly as effective antidepressant agents, therapeutically applicable in the management of depressive states.

It is, accordingly, an object of the present invention to provide novel compounds which have a high degree of antidepressive activity. An additional object is the provision of compounds having antidepressive activity and which produce minimal side effects. Another object is to provide certain novel 2-(1 - substituted - 3 - pyrrolidinyl)-isoindolines. A still further object is to provide a method for preparing the novel 2-(1-substituted-3-pyrrolidinyl)-isoindolines. Additional objects will be apparent to one skilled in the art and still other objects will become apparent hereinafter.

The term "lower alkyl" as used herein includes straight and branched chain radicals of from 1 to 8 carbon atoms inclusive. Examples of lower alkyl radicals are methyl, ethyl, propyl, isopropyl, n-butyl, isobutyl, amyl, hexyl, heptyl, and octyl radicals.

"Lower alkyleneoxy" has the formula -lower alkylene-O— wherein lower alkylene includes such radicals as methylene, ethylene, propylene, butylene and the like.

"Lower alkoxy" has the formula —O-lower alkyl.

By the term phenyl is meant the unsubstituted phenyl radical and phenyl radicals substituted by any radical or radicals which are not reactive or otherwise interfering under the conditions of the reaction, such as lower alkyl, trifluoromethyl and lower alkoxy. Included in the term phenyllower alkyl are groups such as benzyl, phenethyl, phenpropyl and the like. Lower cycloalkyl radicals include such groups as cyclobutyl, cyclopentyl, cyclohexyl and the like.

The invention also includes acid addition salts of the above defined bases of Formula I formed with nontoxic organic and inorganic acids. Such salts are easily prepared by methods known in the art. When the compounds are to be used as intermediates for preparing other compounds or for any other non-pharmaceutical use, the toxicity or nontoxicity of the salt is immaterial; when the compounds are to be used as pharmaceuticals, they are most conveniently used in the form of nontoxic acid-addition salts. Both toxic and nontoxic salts are therefore within the purview of the invention. The acids which can be used to prepare the preferred nontoxic acid-addition salts are those which produce, when combined with the free bases, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent such as ethyl ether or isopropyl ether, with the desired salt separating directly. Exemplary of such organic salts are those formed with maleic, fumaric, benzoic, ascorbic, pamoic, succinic, tartaric, citric, lactic, itaconic, p-aminobenzoic, stearic acid and the like. Exemplary of such inorganic salts are those prepared using hydrochloric, hydrobromic, sulfuric, sulfamic, phosphoric and nitric acids.

In general, the novel compounds of this invention are prepared from N-(3 - pyrrolidinyl) - phthalimides disclosed in U.S. Pat. 3,316,276 and in copending application Ser. No. 592,263 filed Nov. 7, 1966, now abandoned.

In the preferred method of preparing the novel compounds of Formula I, starting from N-(3-pyrrolidinyl)-phthalimides, the reaction materials and conditions are generally as follows:

An N-(1-substituted-3-pyrrolidinyl)-phthalimide is dissolved in, or suspended in, an anhydrous organic solvent as, for example, ether, tetrahydrofuran, benzene and the like, and the solution or suspension added to a vigorously stirred slurry of lithium aluminum hydride and an anhydrous organic solvent selected from among those described hereinabove at a rate sufficient to maintain refluxing conditions. The stirred reaction mixture is refluxed, following addition of the phthalimide compound, for an additional period of time until analysis of an aliquot indicates complete reduction of the carbonyl groups of the phthalimide moiety to methylene groups. The excess metal hydride is destroyed by the careful addition of water, the resulting alumina complex is decomposed by adding dilute alkali and the organic layer containing the crude 2-(1-substituted-3-pyrrolidinyl)-isoindoline is separated. The organic layer containing the crude product is successively washed with water, dried over an inert drying agent as, for example, sodium sulfate, and concentrated under reduced pressure. The residual crude 2-(1-substituted-3-pyrrolidinyl)-isoindoline remaining after concentration is purified by further treatment as, for example distillation in vacuo, conversion to an acid addition salt which is repeatedly recrystallized until a constant melting point is obtained, chromatography or crystallization.

2-(3-pyrrolidinyl)-isoindoline prepared by hydrogenolysis of 2-(1-benzyl-3-pyrrolidinyl)-isoindoline is especially useful in preparing additional novel compounds of the present invention within the scope of Formula I, having a reactive hydrogen atom present in the 1-position of the pyrrolidine moiety capable of entering into reactions with a variety of reactants to give compounds as hereinabove mentioned. Thus, 2-(3-pyrrolidinyl)-isoindoline is reacted with a phenyllower alkyl halide as, for example, 2-phenyl ethylbromide, in an organic solvent as, for example, benzene, toluene, xylene, ethanol, and the like, containing an inorganic acid binder such as a metal carbonate. The reaction mixture is stirred, usually at the reflux temperature of the solvent employed, cooled, washed with water, concentrated and the residual material remaining after evaporation of the organic solvent, purified by one of the methods described hereinabove. The reaction described above with a phenyllower alkyl halide is not limited thereto, and any reactant containing an active halogen atom is capable of entering into the reaction as described above and is within the scope of the present invention. Of particular value are ω-haloalkanols which, when reacted with 2-(3-pyrrolidinyl)-isoindoline, give 2-[1-(ω-hydroxyalkyl)-3-pyrrolidinyl] - isoindolines which are of value in preparing other useful and novel compounds embraced by Formula I.

The foregoing is a general description of how to prepare the compounds of the invention. The following examples illustrate the preparation of specific compounds but shall not be construed as a limitation of the scope of the invention set forth in Formula I.

EXAMPLE 1

2-[1-(2-phenylethyl)-3-pyrrolidinyl]-isoindoline dihydrochloride

A mixture of 11.3 g. (0.06 mole) of 2-(3-pyrrolidinyl)-isoindoline, 11.1 g. (0.06 mole) of 2-phenylethylbromide, 20 g. of potassium carbonate and 100 ml. of toluene was stirred at reflux for 16 hours. The suspension was cooled, treated with 100 ml. of water and the organic layer separated. The organic layer was washed with water and the solvent evaporated at reduced pressure. The residual oil was dissolved in isopropanol and treated with ethereal hydrogen chloride solution. The white crystalline dihydrochloride salt which separated on standing was recrystallized several times from isopropanol. The salt melted with decomposition at 216–219° C. and weighed 9.0 g. (42% yield).

Analysis.—Calc'd for $C_{20}H_{26}Cl_2N_2$ (percent): C, 65.75; H, 7.17; N, 7.67. Found (percent): C, 65.58; H, 7.12; N, 7.50.

Using the procedure of Example 1, 2-(3-pyrrolidinyl)-isoindoline is reacted with 3-phenylpropylbromide to give 2-[1-(3-phenylpropyl)-3-pyrrolidinyl]-isoindoline.

EXAMPLE 2

2-(1-cyclohexyl-3-pyrrolidinyl)-isoindoline difumarate

In a 500 ml. three-necked flask equipped with a stirrer, dropping funnel and efficient condenser and protected by a drying tube, there were introduced 3.8 g. (0.10 mole) of lithium aluminum hydride and 100 ml. of dry ether. The resulting suspension was stirred and a solution of 10 g. (0.033 mole) of N-(1-cyclohexyl-3-pyrrolidinyl)-phthalimide in 200 ml. of ether and 60 ml. of benzene was slowly added thereto at a rate which maintained gentle refluxing. After the addition had been completed, stirring and refluxing were continued for one hour. The mixture was cooled and 30 ml. of water was added slowly to decompose the excess amount of reducing agent. The organic solvents were separated and the precipitated alumina decomposed by the addition of 150 ml. of 25% NaOH solution. The basic solution was extracted several times with ether. The combined extracts were washed with water, dried over magnesium sulfate and the solvent was evaporated at reduced pressure. The residual oil which weighed 8.0 g. (86% yield) showed no bands in its infrared spectrum in the area characteristic of carbonyl groups. The recovered oil (8.0 g./0.03 mole) was dissolved in 50 ml. of isopropanol and the solution treated with a hot solution of 7.0 g. (0.06 mole) of fumaric acid in 200 ml. of isopropanol. The product which crystallized on cooling was recrystallized from an ethanol-methanol mixture. The white salt weighed 11.1 g. (67% yield) and melted at 203–204° C.

Analysis.—Calc'd for $C_{26}H_{34}N_2O_8$ (percent): C, 62.14; H, 6.82; N, 5.58. Found (percent): C, 61.99; H, 6.92; N, 5.91.

EXAMPLE 3

2-(1-benzyl-3-pyrrolidinyl)-isoindoline dihydrochloride

In a two liter, three-necked flask equipped with a stirrer, dropping funnel and an efficient condenser protected by a drying tube, 22.8 g. (0.6 mole) of lithium aluminum hydride and 400 ml. of dry ether was added. The resulting slurry was stirred and a suspension of 6.13 g. (0.2 mole) of N-(1-benzyl-3-pyrrolidinyl)-phthalimide in 900 ml. of dry ether was added slowly at a rate which maintained vigorous refluxing. After the addition had been completed, stirring and refluxing were continued for two hours. The cooled mixture was treated with 60 ml. of ethyl acetate and then with 60 ml. of water added slowly to the reaction mixture. After the organic layer had been separated, the precipitated alumina was decomposed by the addition of 500 ml. of 25% NaOH solution. The basic aqueous solution was extracted several times with ether. The combined ether extracts were washed with water, dried over magnesium sulfate and the solvent evaporated. The residual oil was distilled at reduced pressure and the fraction boiling at 165–166° C./.05 mm. was collected. The water-white nonviscous oil weighed 38.6 g. (70% yield); $n_D^{24}$ 1.5822. A portion of the free base (10.0 g.) was dissolved in isopropyl alcohol and treated with an ether hydrogen chloride solution. The dihydrochloride salt which formed was recrystallized from an isopropanol-isopropyl ether mixture. The product weighed 7.1 g. (56% yield) and melted at 239–340° C. with decomposition.

Analysis.—Calculated for $C_{19}H_{24}Cl_2N_2$ (percent): C, 64.95; H, 6.89; N, 7.98. Found (percent): C, 65.04; H, 6.96; N, 8.07.

EXAMPLE 4

2-(1-isopropyl-3-pyrrolidinyl)-isoindoline dihydrochloride

In a one-liter three-necked flask fitted with a stirrer, dropping funnel and an efficient condenser protected by a drying tube, there was introduced 3.8 g. (0.10 mole) of lithium aluminum hydride and 100 ml. of dry ether. The slurry was stirred and a solution of 12.9 g. (0.05 mole) of N-(1-isopropyl-3-pyrrolidinyl)-phthalimide in 500 ml. of dry ether was added at a rate which maintained gentle refluxing. Following completion of the addition, refluxing was continued for one hour. Thirty ml. of water was added to the cooled mixture to decompose the excess amount of reducing agent. The ether layer was separated and the precipitated alumina decomposed by the addition of 300 ml. of 25% sodium hydroxide solution. The aqueous solution was extracted several times with ether, the combined extracts were washed with water, dried over magnesium sulfate and the ether evaporated. The residual oil was distilled at reduced pressure and the fraction distilling at 102–104° C./0.3 mm. collected.

The water-white, nonviscous oil weighed 9.6 g. (83% yield); $n_D^{24}$ 1.5372. The free base (8.0 g.) was dissolved in isopropanol and the solution treated with an ether-hydrogen chloride solution. The white salt which formed on standing was recrystallized from an isopropanol-isopropyl ether mixture. The dihydrochloride melted at 239.5–241° C. and weighed 7.9 g. (74% yield).

*Analysis.*—Calculated for $C_{15}H_{24}Cl_2N_2$ (percent): C, 59.40; H, 7.98; N, 9.24. Found (percent): C, 59.40; H, 7.97; N, 9.17.

EXAMPLE 5

2-(1-phenyl-3-pyrrolidinyl)-isoindoline

A slurry of 22 g. (0.0755 mole) of N-(1-phenyl-3-pyrrolidinyl)-phthalimide in 150 ml. tetrahydrofuran was added dropwise to a stirred slurry of 12.9 g. (0.34 mole) of lithium aluminum hydride in 250 ml. of tetrahydrofuran. Following completion of the addition, the mixture was refluxed under a nitrogen atmosphere for two hours, cooled, and neutralized with a magnesium sulfate water slurry. The precipitate of salt was filtered and washed with tetrahydrofuran. The filtrate was evaporated under reduced pressure and yielded an oil which solidified. Recrystallization from isooctane gave 11.9 g. (50%) of product which melted at 109–112° C. An analytical sample recrystallized twice from isooctane melted at 110–113° C.

*Analysis.*—Calculated for $C_{18}H_{20}N_2$ (percent): C, 81.78; H, 7.63; N, 10.60. Found (percent): C, 81.56; H, 7.63; N, 10.80.

EXAMPLE 6

2-(1-methyl-3-pyrrolidinyl)-isoindoline difumarate

Into a two-liter, three-necked flask provided with a stirrer, dropping funnel and efficient condenser (system under nitrogen) there were introduced 3.8 g. (0.10 mole) of lithium aluminum hydride and 500 ml. of dry ether. To the stirred slurry was added a solution of 12.0 g. (0.052 mole) of N-(1-methyl-3-pyrrolidinyl)-phthalimide in 700 ml. of dry ether at a rate which maintained gentle refluxing. After the addition was completed, refluxing and stirring were continued for another hour. The cooled mixture was treated with 30 ml. of water to decompose the excess reducing agent. The ether layer was separated and the aqueous alumina was decomposed by the addition of 200 ml. of 25% sodium hydroxide. The basic aqueous solution was extracted several times with ether. The combined extracts were dried over magnesium sulfate and the ether evaporated. The residual oil was distilled at reduced pressure and the fraction distilling at 85–87° C./.04 mm. was collected. The water-white, nonviscous oil weighed 7.6 g. (72% yield). To a solution of 6.2 g. (0.03 mole) of the free base in 300 ml. hot isopropanol was added 3.5 g. (0.03 mole) of fumaric acid. The solution was heated several minutes, filtered and upon cooling a white crystalline product separated from the solution. The salt weighed 5.0 g. and melted with decompositon at 180–182° C. Elemental analysis showed that the product was difumarate salt.

*Analysis.*—Calculated for $C_{21}H_{26}N_2O_8$ (percent): C, 58.05; H, 6.03; N, 6.44. Found (percent): C, 58.13; H, 6.07; N, 6.47.

EXAMPLE 7

2-(1-ethyl-3-pyrrolidinyl)-isoindoline dihydrochloride

In a 500 ml. three-necked flask equipped with a stirrer, dropping funnel and efficient condenser protected by a drying tube, there were placed 3.8 g. (0.10 mole) of lithium aluminum hydride and 100 ml. of dry ether. The resulting slurry was stirred and a suspension of 12.2 g. (0.05 mole) of N-(1-ethyl-3-pyrrolidinyl)-phthalimide in 300 ml. of dry ether was added at a rate which maintained gentle refluxing. After the addition was completed, refluxing was continued for one hour. The mixture was cooled and 30 ml. of water was added thereto to decompose the excess amount of reducing agent. The ether was separated and the precipitated alumina decomposed by the addition of 150 ml. of 25% sodium hydroxide solution. The basic aqueous solution was extracted several times with ether. The combined ether extracts were washed with water, dried over sodium sulfate and the ether evaporated. The residual oil was distilled at reduced pressure and the fraction distilling at 105–107° C./.001 mm. was collected. The water-white, nonviscous oil weighed 7 g. (65% yield) $n_D^{23}$ 1.5423. The free base (6.0 g.) was dissolved in ether and treated with an ether hydrogen chloride solution. The salt which formed was separated and recrystallized from an isopropanol-ether mixture. The salt weighed 5.5 g. and melted at 238–240° C.

*Analysis.*—Calculated for $C_{14}H_{22}Cl_2N_2$ (percent): C, 58.13; H, 7.67; N, 9.69. Found (percent): C, 57.83; H, 7.66; N, 9.75.

EXAMPLE 8

2-(1-butyl-3-pyrrolidinyl)-isoindoline

To a stirred slurry of 3.8 g. (0.10 mole) of lithium aluminum hydride and 100 ml. of dry ether in a system protected from atmospheric moisture was added a solution of 13.6 g. (0.05 mole) of N-(1-butyl-3-pyrrolidinyl)-phthalimide at a rate which maintained gentle refluxing was continued for an additional one hour period after addition by external application of heat. The cooled reaction mixture was treated successively with water and 25% caustic solution and the ether layer separated and dried. The ether solution was concentrated and the residue oil distilled in vacuo to give the product 2-(1-butyl-3-pyrrolidinyl)-isoindoline.

EXAMPLE 9

4-chloro-2-(1-cyclohexyl-3-pyrrolidinyl)-isoindoline

A solution of 33.2 g. (0.10 mole) of 4-chloro-N-(1-cyclohexyl-3-pyrrolidinyl)-phthalimide in 250 ml. of dry tetrahydrofuran was added slowly to a well-stirred slurry of 7.6 g. (0.20 mole) of lithium aluminum hydride and 300 ml. of dry ether in a system protected from atmospheric moisture. The gentle refluxing which accompanied the addition was continued for two hours by external application of heat. Following the reflux period the cooled reaction mixture was treated with water and then with 25% caustic solution. The separated ether layer was washed with water, dried over sodium sulfate, concentrated and the residual oil distilled to give 4-chloro-2-(1-cyclohexyl-3-pyrrolidinyl)-isoindoline.

EXAMPLES 10–21

By following the principles of the manipulative procedures described in the preceding examples, the following compounds are prepared:

2-(1-phenyl-2-methyl-3-pyrrolindinyl)-isoindoline
4-trifluoromethyl-2-(1-phenyl-3-pyrrolidinyl)-isoindoline
4-methoxy-2-(1-ethyl-2-pyrrolidinyl)-isoindoline
4,5-diethyl-2-(1-phenyl-3-pyrrolidinyl)-isoindoline
2-(1-cyclopentyl-3-pyrrolidinyl)-isoindoline
2-(1-cyclohexyl-2-methyl-3-pyrrolidinyl)-isoindoline
5-ethyl-2-(1-ethyl-3-pyrrolidinyl)-isoindoline
4,5-diethyl-2-(1-cyclohexyl-3-pyrrolidinyl)-isoindoline
4-methyl-2-(1,2,2-trimethyl-3-pyrrolidinyl)-isoindoline
5,6-dichloro-2-(1-ethyl-3-pyrrolidinyl)-isoindoline
4,5-dimethoxy-2-(1-ethyl-3-pyrrolidinyl)-isoindoline
5-methyl-2-(1-cyclopentyl-3-pyrrolidinyl)-isoindoline.

EXAMPLE 22

2-(3-pyrrolidinyl)-isoindoline dihydrochloride

A mixture of 27.8 g. (0.10 mole) of 2-(1-benzyl-3-pyrrolidinyl)-isoindoline, 6 g. of Raney nickel and 100 ml. of ethanol was shaken 30 minutes, filtered and the filtrate transferred to a pressure bottle, together with 12 g. of palladium-on-charcoal catalyst. The mixture was shaken in three atmospheres of hydrogen at 60° C. until one equivalent of hydrogen had been absorbed. The cooled mixture was filtered, the filtrate concentrated and the residual oil distilled to give 13.5 g. (72%) of water-white oil (B.P. 92° C./0.05 mm.).

*Analysis.*—Calculated for $C_{12}H_{16}N_2$ (percent): C, 76.55; H, 8.57. Found (percent): C, 76.55; H, 8.68.

The dihydrochloride salt prepared in isopropanol using ethereal hydrogen chloride melted at 252–254° C. (dec.).

*Analysis.*—Calculated for $C_{12}H_{18}Cl_2N_2$ (percent): Cl, 27.15. Found (Volhard): Cl, 26.89.

EXAMPLE 23

2-[1-(3-hydroxypropyl)-3-pyrrolidinyl]-isoindoline

A mixture of 51.5 g. (0.27 mole) of 2-(3-pyrrolidinyl)-isoindoline, 38.0 g. (0.27 mole) of trimethylene bromohydrin 90 g. of potassium carbonate and 900 ml. of toluene was allowed to stand at ambient temperature for two hours and then stirred at reflux for 18 hours. The cooled reaction mixture was treated with about 100 ml. of water, the organic layer was separated, washed with cold water and the solvent evaporated. The residual oil was distilled under reduced pressure and the fraction distilling at 154–157° C./0.005 mm. collected. The product crystallized on standing and melted at 73–75° C. and weighed 26.2 g. (39% yield).

*Analysis.*—Calculated for $C_{12}H_{18}Cl_2N_2$ (percent): Cl, 73.13; H, 9.00; N, 11.37. Found (percent): C, 73.39; H, 9.10; N, 11.35.

Using the procedure described above, the following compounds are prepared:

2-[1-(2-hydroxyethyl)-3-pyrrolidinyl]-isoindoline is prepared from 2-(3-pyrrolidinyl)-isoindoline and 2-bromoethanol.

2-[1-(4-hydroxybutyl)-3-pyrrolidinyl]-isoindoline is prepared from 2-(3-pyrrolidinyl)-isoindoline and 4-bromobutanol.

EXAMPLE 24

2-[1-(3-N-methylcarbamyloxypropyl)-3-pyrrolidinyl]-isoindoline difumarate

There was slowly added to a stirred solution of 7.4 g. (0.03 mole) 2-[1-(3-hydroxypropyl) - 3 - pyrrolidinyl]-isoindoline in 50 ml. of benzene at room temperature, a solution of 2.6 g. (0.045 mole) of methyl isocyanate in 15 ml. of dry benzene. The resulting solution was stirred 64 hours at ambient temperature and then the solvent was evaporated. The residue was added to a solution of 7.0 g. (0.06 mole) fumaric acid in 200 ml. of hot isopropanol. The mixture was heated several minutes, filtered and cooled. The white crystalline product which formed was separated by filtration and recrystallized from isopropanol. The salt weighed 8.8 g. (55% yield) and melted with decomposition at 164–166° C.

*Analysis.*—Calculated for $C_{25}H_{33}N_3O_{10}$ (percent): C, 56.07; H, 6.21; N, 7.85. Found (percent): C, 55.92; H, 6.23; N, 7.83.

EXAMPLE 25

2-[1-(3-N-phenylcarbamoyloxypropyl)-3-pyrrolidinyl]-isoindoline fumarate

To a stirred solution of 4.1 g. (0.016 mole) 2-[1-(3-hydroxypropyl)-3-pyrrolidinyl]-isoindoline in 50 ml. of dry benzene at ambient temperature was slowly added 1.0 g. (0.016 mole) of phenyl isocyanate in 25 ml. of dry benzene. The resulting solution was stirred for 70 hours at room temperature under an atmosphere of nitrogen and the solvent was evaporated at reduced pressure. A portion of the residual oil (2.2 g./0.006 mole) was dissolved in isopropanol and treated with 0.36 g. (0.003 mole) of fumaric acid. The light tan salt which formed on cooling weighed 2.0 g. and melted with decomposition at 173–175° C.

*Analysis.*—Calculated for $C_{24}H_{29}N_3O_4$ (percent): C, 68.06; H, 6.90; N, 9.92. Found (percent): C, 67.98; H, 6.97; N, 9.87.

EXAMPLE 26

2-[1-(N-4-methoxyphenylcarbamoyl)-3-pyrrolidinyl]-isoindoline

To a stirred solution of 5.6 g. (0.03 mole) of 2-(3-pyrrolidinyl)-isoindoline in 40 ml. of dry benzene there was added over a period of 30 minutes 4.5 g. (0.03 mole of 4-methoxyphenyl isocyanate in 50 ml. of dry benzene. A white precipitate was formed during the addition of the isocyanate. The mixture was stirred at room temperature for 16 hours at the product separated by filtration. The white compound weighed 9.5 g. (94% yield) and melted at 193–194° C. The melting point was not changed by recrystallization of a sample from an isopropanol-ethanol mixture.

*Analysis.*—Calculated for $C_{20}H_{23}N_3O_2$ (percent): C, 71.19; H, 6.87; N, 12.45. Found (percent): C, 71.52; H, 7.06; N, 12.67.

EXAMPLE 27

2-(1-carbamoyl-3-pyrrolidinyl)-isoindoline

A mixture of 9.4 g. (0.05 mole) of 2-(3-pyrrolidinyl)-isoindoline, 7.4 g. (0.07 mole) of nitrourea and 50 ml. of 95% ethanol was stirred and heated at about 50° C. until the evolution of gas ceased. Following evaporation of the solvent, the residue was recrystallized several times from ethyl acetate. The white product melted with decomposition at 173–174° C. and weighed 6.5 g. (57% yield).

*Analysis.*—Calculated for $C_{13}H_{17}N_3O$ (percent): C, 67.50; H, 7.41; N, 18.17. Found (percent): C, 67.46; H, 7.37; N, 18.16.

EXAMPLE 28

2-(1-amidino-3-pyrrolidinyl)-isoindoline sulfate

A mixture of 11.3 g. (0.06 mole) of 2-(3-pyrrolidinyl)-isoindoline, 8.4 g. (0.03 mole) of 2-methyl-2-thiopseudourea sulfate and 50 ml. of 50% ethanol was stirred and heated at reflux until the evolution of gas ceased. The white crystalline product which formed on cooling was separated by filtration, washed with isopropanol and recrystallized from an isopropanol-water mixture. The product weighed 12.2 g. (69% yield) and melted above 300° C.

*Analysis.*—Calculated for $C_{26}H_{38}N_8SO_4$ (percent): C, 55.89; H, 6.86; N, 20.06. Found (percent): C, 56.01; H, 6.84; N, 19.96.

EXAMPLE 29

2-(1-methylcarbamoyl-3-pyrrolidinyl)-isoindoline

To a cooled solution of 9.4 g. (0.05 mole) of 2-(3-pyrrolidinyl)-isoindoline in 50 ml. of dry benzene there was added over a period of 20 minutes a solution of 2.9 g. (0.05 mole) of methyl isocyanate in 40 ml. of dry benzene, a white solid separating during the addition. The mixture was stirred for a further hour at ambient temperature and then the product was separated by filtration. After the compound was recrystallized from a benzene-isopropyl ether mixture, it melted at 125–128° C. (rapid heating) and weighed 8.1 g. (66% yield). When the compound was heated slowly it softened at 126° C. and melted with decomposition at 130–132° C.

*Analysis.*—Calculated for $C_{14}H_{19}N_3O$ (percent): C, 68.54; H, 7.81; N, 17.13. Found (percent): C, 68.40; H, 7.59; N, 17.19.

EXAMPLE 30

2-(1-N,N-diphenylcarbamoyl-3-pyrrolidinyl)-isoindoline

A mixture of 7.0 g. (0.037 mole) of 2-(3-pyrrolidinyl)-isoindoline, 8.6 g. (0.037 mole) of diphenylcarbamoyl chloride, 10 g. of potassium carbonate, 50 ml. of chloroform and 25 ml. of water was stirred vigorously for 16 hours. The chloroform layer was separated, washed with water and dried over magnesium sulfate. The crystalline product, which formed when the solvent was evaporated, was recrystallized from a benzene-isooctane mixture. The white product melted at 135–136° C. and weighed 10.5 g. (75% yield).

Analysis.—Calculated for $C_{25}H_{25}N_3O$ (percent): C, 78.30; H, 6.57; N, 10.96. Found (percent): C, 78.59; H, 6.69; N, 10.95.

Using the procedure described above, 2-(3-pyrrolidinyl)-isoindoline is reacted with di-p-tolylcarbamoyl chloride to give 2-[1-(di-p-tolylcarbamoyl)-3-pyrrolidinyl]-isoindoline.

EXAMPLE 31

2-[1-(4-chlorophenoxyacetyl)-3-pyrrolidinyl]-isoindoline

To a cooled stirred solution of 5.6 g. (0.03 mole) of 2-(3-pyrrolidinyl)-isoindoline in 30 ml. of chloroform was slowly added a solution of 6.2 g. (0.03 mole) of 4-chlorophenoxyacetyl chloride in 20 ml. chloroform. After the addition was completed, the mixture was stirred for 30 minutes at room temperature and then treated with 100 ml. of 10% sodium bicarbonate solution. The chloroform layer was separated, washed with water and the chloroform evaporated. The dark residue which solidified on cooling was recrystallized several times from a benzene-isooctane mixture, using charcoal to remove colored impurities. The light tan product melted at 137–138° C. and weighed 4.5 g. (42% yield).

Analysis.—Calculated for $C_{20}H_{21}N_2O_2Cl$ (percent): C, 67.31; H, 5.93; N, 7.85. Found (percent): C, 67.36; H, 5.82; N, 7.81.

EXAMPLES 32–40

By following the principles described in the preceding examples, the following compounds are prepared:

2-[1-(2-N-methylcarbamoyloxyethyl)-3-pyrrolidinyl]-isoindoline
2-[1-(2-N-p-chlorophenylcarbamoyloxyethyl)-pyrrolidinyl]-isoindoline
2-[1-(2-N-p-chlorophenylcarbamoyloxyethyl)-3-pyrrolidinyl}-isoindoline
2-[1-(N-4-chlorophenylcarbamoyl)-3-pyrrolidinyl]-isoindoline
2-[1-(N-3-trifluoromethylphenylcarbamoyl)-3-pyrrolidinyl]-isoindoline
2-[1-(4-N-phenylcarbamoyloxybutyl)-3-pyrrolidinyl]-isoindoline
2-[1-(3-N-butylcarbamoyloxypropyl)-3-pyrrolidinyl]-isoindoline
2-(1-N-butylcarbamoyl-3-pyrrolidinyl)-isoindoline
2-[1-(N-4-chlorophenylcarbamoyl)-3-pyrrolidinyl]-isoindoline.

The selective antidepressant activity of the novel 2-(1-substituted - 3 - pyrrolidinyl) - isoindolines described above was determined and the compounds of this invention may be used as antidepressants in accordance with the procedures described by Beryl M. Askew [Life Sciences, No. 10, pp. 725–730 (1963)]. Thus, using the reserpine induced hypothermia procedure described by Askew, female mice were injected subcutaneously (s.c.) with 2 mg./kg. of reserpine in the late afternoon of the day preceding the test. Approximately 18 hours later the temperature of the mice was measured and groups of 8 mice were injected intraperitoneally (i.p.) with the test drug or water. The temperature of the mice was measured at 2 and 4 hours following the injection of the test drug or water. The activity of the compounds as antagonists of reserpine-induced hypothermia was compared with the control drug desmethylimipramine (DMI) and results were calculated as a percentage of DMI response. Among the 2 - (1 - substituted - 3 - pyrrolidinyl) - isoindolines tested the preferred compounds are shown in Table I.

TABLE I

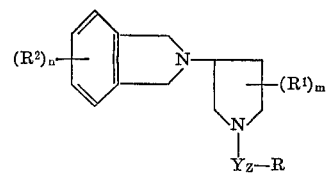

| R | Dose and route | Time post drug (hrs.) | Percent of DMI response |
|---|---|---|---|
| —$C_2H_5$ | 2 mg./kg. i.p. | 4 | 77.9 |
| —$CH_3$ | 2 mg./kg. i.p. | 2 | 29.0 |
|  |  | 4 | 65.4 |
| —H | 2 mg./kg. i.p. | 2 | 57.0 |
|  |  | 4 | 81.3 |
| —$C_6H_{11}$a | 20 mg./kg. i.p. | 2 | 61.3 |
|  |  | 4 | 55.1 |
| —$C_6H_5$b | 20 mg./kg. i.p. | 2 | 8.1 |
|  |  | 4 | 6.1 |
| —$CH_2$—$C_6H_5$b | 20 mg./kg. i.p. | 2 | 30.7 |
|  |  | 4 | 46.7 | a —$C_6H_{11}$ is cyclohexyl.
b —$C_6H_5$ is phenyl.

Formulation and administration: Effective quantities of any of the foregoing pharmacologically active compounds of Formula I may be administered to a living animal body in any one of various ways; for example, orally as in capsules or tablets, parenterally in the form of sterile solutions or suspensions, and in some cases intravenously; e.g., in the form of sterile isotonic solutions. The free basic amino compounds, while effective, are preferably formulated and administered in the form of their nontoxic acid-addition salts for the purpose of increased solubility. The compounds of Formula I, especially in the form of their acid addition salts, represent a preferred group of active compounds.

Although very small quantities of the active materials of the present invention are effective when minor therapy is involved or in case of administration to subjects having a relatively low body weight, unit dosages are usually five milligrams or above and preferably twenty-five or fifty milligrams or even higher, depending of course upon the emergency of the situation and the particular result desired. Five to fifty milligrams appear optimum per unit dose, while usual broader ranges appear to be one to 100 milligrams per unit dose. It is only necessary that the active ingredients constitutes an effective amount; i.e., such that a suitable effective dosage will be obtained consistent with the dosage form employed. Obviously, several unit dosage forms may be administered at about the same time.

The formulations given hereinafter are representative for all of the pharmacologically active compounds of the invention.

Tablets

A typical formulation for a tablet containing 5.0 mg. of active ingredient per tablet follows. The formulation may be used for other strengths of active ingredient by adjustment of weight of dicalcium phosphate.

| | Per tablet, mg. |
|---|---|
| 1. Active ingredient, as salt | 5.0 |
| 2. Corn starch | 13.6 |
| 3. Corn starch (paste) | 3.2 |
| 4. Lactose | 79.2 |
| 5. Dicalcium phosphate | 68.0 |
| 6. Calcium stearate | 0.9 |
| Total | 170.1 |

Additional tablet formulations preferably contain a higher dosage of the active ingredient and are as follows:

A.—25 mg. tablet

| Ingredients: | Per tablet, mg. |
|---|---|
| Active ingredient, as salt | 25.0 |
| Lactose | 45.0 |
| Milo starch | 10.0 |
| Corn starch | 19.0 |
| Calcium stearate | 1.0 |
| Total | 100.0 |

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granulates are passed through a number ten mesh screen and blended with the proper amount of calcium stearate and this blend is then converted into tablets on a suitable press.

B.—50 mg. tablet

| Ingredients: | Per tablet, mg. |
|---|---|
| Active ingredient, as salt | 50.0 |
| Lactose | 90.0 |
| Dicalcium phosphate | 86.1 |
| Starch | 26.0 |
| Milo starch | 10.8 |
| Calcium stearate | 1.1 |
| Total | 270.0 |

Uniformly blend the active ingredient, lactose, dicalcium phosphate, starch and milo starch. This blend is granulated with water and the wet mass is passed through a number eight mesh screen. The wet granules are dried at 140–160° Fahrenheit overnight. The dried granules are passed through a number ten mesh screen. These dried granules are blended with the proper weight of calcium stearate and the lubricated granules are then converted into tablets on a suitable tablet press.

| Ingredients: | Intramuscular injection | Per ml. |
|---|---|---|
| 1. Active ingredient, as salt | mg | 10.0 |
| 2. Isotonic buffer solution 4.0 g.s. to 1.0 ml. | | |

PROCEDURE

1. Dissolve the active ingredient in the buffer solution.
2. Aseptically filter the solution from Step 1.
3. The sterile solution is now aseptically filled into sterile ampules.
4. The ampules are sealed under aseptic conditions.

Various modifications and equivalents will be apparent to one skilled in the art and may be made in the compounds, method and compositions of the present invention without departing from the spirit or scope thereof, and it is, therefore, to be understood that the invention is to be limited only by the scope of the appended claims.

I claim:

1. A compound selected from (A) compounds having the formula:

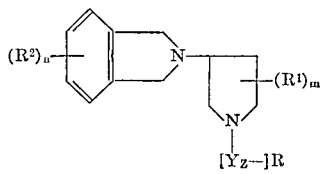

wherein:
R is a member selected from the group consisting of hydrogen, lower alkyl, phenyl, phenyllower-alkyl, cyclohexyl, cyclopentyl, ω-hydroxylower-alkyl, N-lower alkyl carbamoyl, N-lower alkyl carbamoyloxy-lower alkyl, N-phenyl carbamoyloxylower alkyl, N-(4-methoxyphenyl)carbamoyl, N-(4-chlorophenyl)carbamoyl, N-(3-trifluoromethylphenyl)carbamoyl, 4-chlorophenoxyacetyl, N,N-diphenylcarbamoyl, carbamoyl and amidino,
$R^1$ is a member selected from the group consisting of hydrogen and methyl,
$R^2$ is a member selected from the group consisting of hydrogen, halogen having an atomic weight less than 80, trifluoromethyl, lower alkyl and lower alkoxy,
$m$ is a positive integer from 0–2 inclusive,
$n$ is a positive integer from 0–4 inclusive, and
(B) nontoxic pharmaceutically acceptable acid addition salts thereof.

2. A compound of claim 1 which is 2-[1-(2-phenylethyl)-3-pyrrolidinyl]-isoindoline.
3. A compound of claim 1 which is 2-(1-cyclohexyl-3-pyrrolidinyl)-isoindoline.
4. A compound of claim 1 which is 2-(1-benzyl-3-pyrrolidinyl)-isoindoline.
5. A compound of claim 1 which is 2-(1-isopropyl-3-pyrrolidinyl)-isoindoline.
6. A compound of claim 1 which is 2-(1-phenyl-3-pyrrolidinyl)-isoindoline.
7. A compound of claim 1 which is 2-(1-methyl-3-pyrrolidinyl)-isoindoline.
8. A compound of claim 1 which is 2-(1-ethyl-3-pyrrolidinyl)-isoindoline.
9. A compound of claim 1 which is 2-[1-(3-hydroxypropyl)-3-pyrrolidinyl]-isoindoline.
10. A compound of claim 1 which is 2-[1-(3-N-methylcarbamoyloxypropyl)-3-pyrrolidinyl]-isoindoline.
11. A compound of claim 1 which is 2-[1-(3-N-phenylcarbamoyloxypropyl)-3-pyrrolidinyl]-isoindoline.
12. A compound of claim 1 which is 2-[1-(N-4-methoxyphenylcarbamoyl)-3-pyrrolidinyl]-isoindoline.
13. A compound of claim 1 which is 2-(1-carbamoyl-3-pyrrolidinyl)-isoindoline.
14. A compound of claim 1 which is 2-(1-amidino-3-pyrrolidinyl)-isoindoline.
15. A compound of claim 1 which is 2-(1-N-methylcarbamoyl-3-pyrrolidinyl)-isoindoline.
16. A compound of claim 1 which is 2-(1-N,N-diphenylcarbamoyl-3-pyrrolidinyl)-isoindoline.
17. A compound of claim 1 which is 2-[1-(4-chlorophenoxyacetyl)-3-pyrrolidinyl]-isoindoline.

References Cited

UNITED STATES PATENTS 3,126,395  3/1964  Kitahonoki et al.
  260—326.1 XR

OTHER REFERENCES

Noller, Chemistry of Organic Compounds, 1965, p. 575.

Wagner et al., Synthetic Organic Chemistry, 1953, p. 645.

ALEX MAZEL, Primary Examiner

J. A. NARCAVAGE, Assistant Examiner

U.S. Cl. X.R.
260—326; 424—274